US009883002B2

(12) United States Patent
Dong et al.

(10) Patent No.: US 9,883,002 B2
(45) Date of Patent: Jan. 30, 2018

(54) METHOD AND SYSTEM FOR ACCESSING WEBSITE (71) Applicant: BEIJING QIHOO TECHNOLOGY COMPANY LIMITED, Xicheng, Beijing (CN)

(72) Inventors: Binyan Dong, Beijing (CN); Peng Sun, Beijing (CN); Huan Ren, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 462 days.

(21) Appl. No.: 14/388,083

(22) PCT Filed: Mar. 19, 2013

(86) PCT No.: PCT/CN2013/072843
§ 371 (c)(1),
(2) Date: Sep. 25, 2014

(87) PCT Pub. No.: WO2013/143403
PCT Pub. Date: Oct. 3, 2013

(65) Prior Publication Data
US 2015/0237158 A1 Aug. 20, 2015

(30) Foreign Application Priority Data
Mar. 31, 2012 (CN) .......................... 2012 1 0093093

(51) Int. Cl.
*H04L 29/12* (2006.01)
*H04L 29/08* (2006.01)
*H04L 29/06* (2006.01)

(52) U.S. Cl.
CPC ...... *H04L 67/2814* (2013.01); *H04L 61/1576* (2013.01); *H04L 67/42* (2013.01)

(58) Field of Classification Search
CPC . H04L 61/1511; H04L 67/02; H04L 67/2804; H04L 61/1576; H04L 67/42; H04L 67/2814
See application file for complete search history.

(56) References Cited

U.S. PATENT DOCUMENTS

2007/0261067 A1* 11/2007 Jones ...................... G06F 9/465
719/328
2009/0328139 A1* 12/2009 Kitamura ............ H04L 29/1232
726/2

(Continued)

FOREIGN PATENT DOCUMENTS

WO 200103356 A1 1/2001

OTHER PUBLICATIONS

Rodriguez et al. "Session Level Techniques for Improving Web Browsing Performance on Wireless Links", May 17, 2004-May 22, 2004. Retrieved on Oct. 28, 2016 from <http://wwwconference.org/www2004/docs/lp121.pdf>.*

(Continued)

*Primary Examiner* — Dustin Nguyen
*Assistant Examiner* — Juan C Turriate Gastulo
(74) *Attorney, Agent, or Firm* — Polsinelli PC (57) ABSTRACT

The present invention relates to the technical field of network and discloses a method and a device for accessing a website. The method comprises: constructing a first domain name query request according to a domain name in a webpage request of a client, and sending the request to a first domain name server; obtaining an identification IP address returned by the first domain name server, wherein the identification IP address is used to identify whether an target IP address corresponding to the domain name in the webpage request belongs to a predetermined IP address library or not; according to the identification IP address, judging to replace the target IP address corresponding to the domain (Continued)

name in the webpage request with an IP address of a proxy server, and according to the IP address corresponding to the proxy server, sending the webpage access request to the proxy server. For a webpage request that a client can directly access the webpage by itself, there is no need to access the webpage via the proxy server, and the proxy server is used only when the client needs to access the webpage via the proxy server, thus reducing the load of the proxy server, and improving the performance of the proxy server.

14 Claims, 4 Drawing Sheets

(56) References Cited

U.S. PATENT DOCUMENTS

| | | | | |
|---|---|---|---|---|
| 2011/0026537 | A1* | 2/2011 | Kolhi | H04L 12/4633 370/401 |
| 2011/0191451 | A1* | 8/2011 | Kuo | G06F 15/177 709/220 |
| 2011/0207433 | A1* | 8/2011 | Miyamoto | G06F 21/41 455/411 |
| 2013/0173769 | A1* | 7/2013 | Seastrom | H04L 61/1552 709/223 |

OTHER PUBLICATIONS

International Search Report regarding Chinese International Application No. PCT/CN2013/072843 dated Jun. 27, 2013, 4 pages.
English translation of abstract only of Chinese application CN101741902A, Title: System and method for Internet terminal to quickly access to Internet server, Publication date: Jun. 16, 2010, Country: CN, Inventors: Hou Wan Chun, one page.
English translation of abstract only of Chinese application CN101764855A, Title: Method, device and system for providing domain name resolution services, Publication date: Jun. 30, 2010, Country: CN, Inventors: Wang Xiaofeng, one page.
English translation of abstract only of Chinese application CN102215228A, Title: Web service unique user identification method based on carrier-class network platform, Publication date: Oct. 12, 2011, Country: CN, Inventors: Liushu Liang et al, one page.
English translation of abstract only of Japanese application JP2010-183242A, Title: Communication Device and DNS Proxy Server, Publication date: Aug. 19, 2010, Country: Japan, Inventors: Hei Yuichiro, one page.

* cited by examiner

METHOD AND SYSTEM FOR ACCESSING WEBSITE

FIELD OF THE INVENTION

The present invention relates to the technical field of network, and particularly to a method and system for accessing a website.

BACKGROUND OF THE INVENTION

The environment of the Education Network is relatively complex, and the Education Network is accessed in a complete CERNET mode in some colleges and in a hybrid access mode of Chinese Unicom, Chinese Telecom and Chinese Mobile in some other colleges. Due to the limitation of charging and the network itself, part of the colleges encounter the problem that they cannot access overseas websites. A solution in the prior art is to build a proxy server and send an HTTP access request of a browser to the proxy server. The proxy server is a server for a client and a client for a server, namely, it serves as an intermediary between the actual client and server ends.

There are two methods related to the proxy server in the prior art.

The first one is a technical solution related to a web proxy server:

A web proxy server is also known as online proxy server. The web proxy server is a proxy server program running in a webpage, and can be accessed by inputting a web address and selecting a proxy server without any setting. The web proxy server caches webpages and files of a remote website for the client so that the client can browse the remote website more quickly and securely. Some web proxy server websites are updated every day, so that the speed of accessing a link is also relatively fast. The principle of the web proxy server may be briefly summarized as follows: user's access—web proxy server—target website—returning to the user. However, due to the settings of such as webpage templates and protocols used by the web proxy server, it has the following drawbacks:

1) Since the web proxy server itself is a webpage and includes a lot of content, use of the web proxy server will consume a lot of traffic, and a website providing the web proxy server is probably confronted with problems such as depletion of the traffic or instability. Besides, the speed of surfing on the Internet via the web proxy server is slower than of normal surfing.

2) Basically, all web proxy server websites have advertisements thereon. Even an advertisement freezing the webpage will occur after the user gets idle for a period of time, which can only be solved by finding SRC (src attribute is used to designate a picture position) of the JavaScript of the advertisement.

3) Due to limitations of protocol settings and templates used by the web proxy server, when other websites are accessed via the web proxy server, abnormity might occur upon accessing advanced websites based on such as AJAX. For example, there might be something wrong with items for such as supplementing content, publishing opinions and submitting votes. Besides, situations such as failure to display or abnormal display of styles might occur when the web proxy server is used.

The second method is the so-called transparent proxy server, namely, a client directly accesses a target website through a proxy server. The solution may be roughly described as follows: the client first establishes connection to the proxy server, then requests to establish connection to a target server or obtains a designated resource of the target server according to the proxy server protocol used by the proxy server. The solution can solve the drawbacks of the aforesaid web proxy server.

However, in this solution, once the client uses the proxy server, it will send all local http access requests to the proxy server, the proxy server then construct a DNS (Domain Name System) request according to the http access requests to query for the IP of the target website, and then obtains corresponding content from the target website and returns it to the client. As such, since all http access requests are totally delivered to the proxy server, the proxy server has excessive load and its performance is reduced. That is to say, in the prior art, if the client has an IP that belongs to a predetermined IP address library and cannot directly access websites outside the predetermined IP address library, when the client uses the proxy server to access websites outside the IP address library, all the client's HTTP access requests will be forwarded and received via the proxy server. Since all http requests are delivered to the proxy server, successive load is caused to the proxy server and the performance of the proxy server is reduced.

SUMMARY OF THE INVENTION

In view of the above problems, the present invention is proposed to provide a method and a system for accessing a website, which can overcome the above problems or at least partially solve or ease the above problems.

According to an aspect of the present invention, there is provided a method for accessing a website, comprising: constructing a first domain name query request according to a domain name in a webpage request of a client, and sending the first domain name query request to a first domain name server; obtaining an identification IP address returned by the first domain name server, wherein the identification IP address is used to identify whether an target IP address corresponding to the domain name in the webpage request belongs to a predetermined IP address library or not; according to the identification IP address, judging to replace the target IP address corresponding to the domain name in the webpage request with an IP address of a proxy server, and according to the IP address corresponding to the proxy server, sending the webpage access request to the proxy server.

According to another aspect of the present invention, there is provided a method for accessing a website, comprising: receiving a first domain name query request sent by a client; constructing a second domain name query request according to the first domain name query request, and sending it to a second domain name server; after obtaining a response from the second domain name server, resolving a target IP address corresponding to the response, wherein the target IP address is corresponding to a domain name of the webpage request; judging according to a predetermined IP address library whether the target IP address is in the predetermined IP address library, and generating an identification IP address according to the judgment result, wherein the identification IP address is used to identify whether the target IP address corresponding to the domain name in the webpage request belongs to the predetermined IP address library or not; returning the identification IP address to the client.

According to a further aspect of the present invention, there is provided a device for accessing a website, comprising: a domain name reconstructing module configured to construct a first domain name query request according to a domain name in a webpage request of a client, and send the first domain name query request to a first domain name server; an address obtaining module configured to obtain an identification IP address returned by the first domain name server, wherein the identification IP address is used to identify whether an target IP address corresponding to the domain name in the webpage request belongs to a predetermined IP address library or not; a judging module configured to, according to the identification IP address, judge to replace the target IP address corresponding to the domain name in the webpage request with an IP address of a proxy server, and according to the IP address corresponding to the proxy server, send the webpage access request to the proxy server.

According to a further aspect of the present invention, there is provided a device for accessing a website, comprising: a domain name query request receiving module configured to receive a first domain name query request sent by a client; a domain name query request processing module configured to construct a second domain name query request according to the first domain name query request, and send it to a second domain name server; a domain name query request response processing module configured to, after obtaining a response from the second domain name server, resolve a target IP address corresponding to the response, wherein the target IP address is corresponding to a domain name of the webpage request; a target IP address judging module configured to judge according to a predetermined IP address library whether the IP address is in the predetermined IP address library, and generate an identification IP address according to the judgment result, wherein the identification IP address is used to identify whether the target IP address corresponding to the domain name in the webpage request belongs to the predetermined IP address library or not; a returning module configured to return the identification IP address to the client.

According to another aspect of the present invention, there is provided a computer program which comprises a computer readable code, wherein when the computer readable code is run on a server, the server executes the method for accessing a website according to any one of claims 1-12.

According to a further aspect of the present invention, there is provided a computer readable medium which stores the computer program according to claim 25.

Advantageous effects of the present invention are as follows:

In the client of the present application, as for a webpage request of the client, a first domain name request is constructed according to the domain name in the client's webpage request, and sent to the first domain name server. The first domain name server judges whether the target IP address corresponding to the domain name is in the predetermined IP address library, and the client is notified according to the judgment result to decide whether to replace the target IP corresponding to the domain name in the webpage request with the IP address of the proxy server. As such, for a webpage request that a client can directly access the webpage by itself, there is no need to access the webpage via the proxy server, and the proxy server is used only when the client needs to access the webpage via the proxy server, thereby reducing the load of the proxy server, and improving the performance of the proxy server.

The above description only generalizes technical solutions of the present invention. The present invention may be implemented according to the content of the description in order to make technical means of the present invention more apparent. Specific embodiments of the present invention are exemplified to make the above and other objects, features and advantages of the present invention more apparent.

BRIEF DESCRIPTION OF DRAWINGS

Various other advantages and merits will become apparent to those having ordinary skill in the art by reading the following detailed description of preferred embodiments. Figures are only intended to illustrate preferred embodiments and not construed as limiting the present invention. In all figures, the same reference number denotes the same part. In the figures.

DETAILED DESCRIPTION OF EMBODIMENTS

The present invention will be further described below with reference to figures and specific embodiments.

Figure 1:
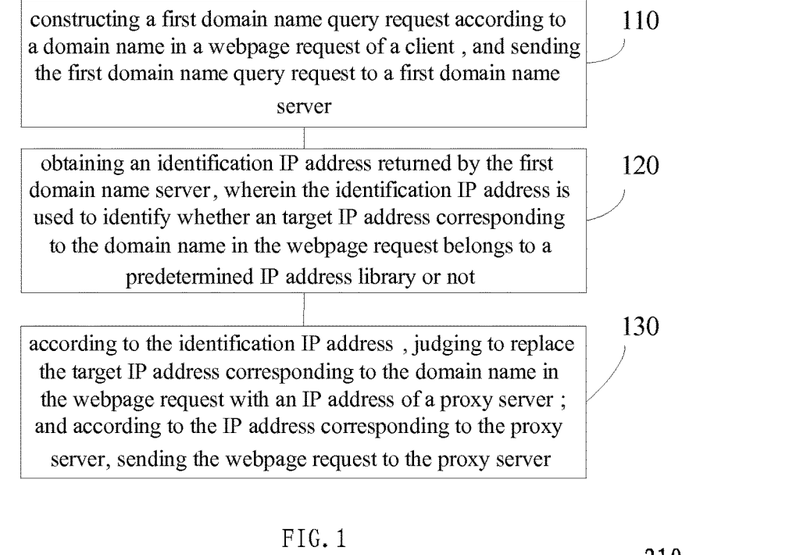
FIG. 1 illustrates a flow chart of a method for accessing a website according to an embodiment of the present invention.

Reference is made to FIG. 1 that illustrates a flow chart of a method for accessing a website according to the present invention. The method may comprise the following steps:

Step 110: constructing a first domain name query request according to a domain name in a webpage request of a client, and sending the request to a first domain name server.

In the present application, a first domain name server (a first DNS server) and a proxy server may be preset, wherein the first domain name server is used to obtain the first domain name query request sent by the client, namely, a target IP address corresponding to the domain name in the DNS query request.

The working principle of the domain name server is generally as follows:

A first step: a client A makes a domain name resolution request and sends the request to a local domain name server.

A second step: after the local domain name server receives the request, it queries a local cache, and it directly returns a query result if there is this record entry.

A third step: if there is not this record in the local cache, the local domain name server directly sends the request to a root domain name server, and then the root domain name server returns an address of a main domain name server of a queried domain (a subdomain of the root) to the local domain name server.

A fourth step: the local server sends a request to the domain name server returned in the previous step, then the server receiving the request queries its own cache, and returns an address of a domain name server at a relevant lower level if there is not this record.

A fifth step: the fourth step is repeated until a correct record is found.

A sixth step: the local domain name server stores the returned result in the cache for use next time, and meanwhile returns the result to the client A.

In the above procedure, the client A generally obtains an IP corresponding to a final domain name only from the domain name server that is the first one receiving the client A's domain name query request.

In practice, the client itself generally sets a default local domain name server. When a HTTP request occurs at the client, the query first begins with the default local domain name server to obtain an IP corresponding to the domain name in the HTTP request. However, in the present application, when the HTTP request occurs at the client, first the client's webpage request is intercepted, the first domain name query request is initiatively constructed according to the domain name in the client's HTTP request, and the first domain name query request is sent to the first domain name server.

As far as the present application is concerned, if the first domain name server is set within the Education Network, optimal DNS IP may be resolved quickly for the client in the Education Network, thereby avoiding network delay caused by a too long DNS IP resolution path caused by the situation such as that the default DNS server is not in the Education Network.

Regarding the client's HTTP request in the present application, the client performs resolution for the domain name in the HTTP request, and constructs a DNS request based on the domain name and sends it to the first domain name server.

Preferably, the step of constructing the first domain name query request according to the domain name in the webpage request of the client and sending the request to the first domain name server comprises:

Step S111: hooking a domain name query function in an operating system by a hook function.

In the present application, Hook may be implemented by Detours library provided by Microsoft, i.e., a system domain name query function Getaddrinfo is hooked by a hook function. The domain name query function Getaddrinfo may be used for domain name resolution service, e.g., translating www.baidu.com into a corresponding IP address so that a network program performs connection. The domain name query function Getaddrinfo may construct DNS A or AAAA command according to RFC1035 protocol, send it to a DNS server, and resolves a response returned by the DNS server to get an IP list. Generally, the first IP address in the IP list is selected as the IP address corresponding to the domain name.

In the present application, when the system performs default domain resolution service, directional sending of the DNS query request may be achieved by hooking the domain name query function.

Step S112: constructing the first domain name query request for the domain name in the client's webpage request by means of the domain query function.

In the present application, after the Getaddrinfo function is hooked, the first domain name query request is constructed based on the local client's IP address and the IP address of the preset first domain name server in the present application. In practice, the first domain name query request is constructed also in combination with a port of the first domain name server.

Figure 2:
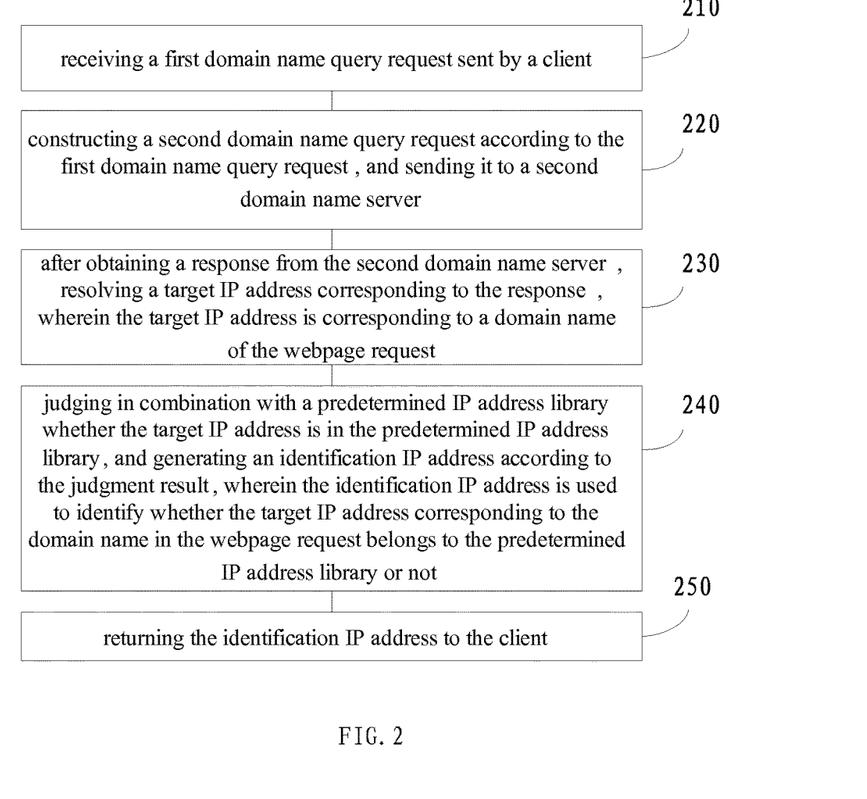
FIG. 2 illustrates a flow chart of a method for accessing a website corresponding to FIG. 1 according to an embodiment of the present invention.

Correspondingly, after the first domain name server obtains the IP corresponding to the domain name in the client's HTTP request, a response is constructed with the client's IP address and the IP address of the first domain name server, and the response is returned to the client. Referring to FIG. 2b, it illustrates an example of DNS response.

Step S113: sending the first domain name query request to the first domain name server.

After the domain name query function is hooked at the client to construct the aforesaid first domain name query request, the first domain name query request is sent to the first domain name server.

Preferably, the sending of the first domain name query request to the first domain name server comprises:

Step S11: sending the domain name query request to the first domain name server by means of an asynchronous I/O mechanism.

Multiple ports (53, 80, 8000 etc.) are bound in an asynchronous and concurrency mode so that some firewalls prohibits use of other DNS servers other than the DNS IP designed by the firewalls. For example, since port 80 is bound, generally the firewall mistakes it as HTTP traffic, so such rules may be broken through.

Further preferably, the asynchronous I/O mechanism comprises I/O completion port mechanism. That is, the DNS query request is sent to the DNS server asynchronously and concurrently by means of POCP mechanism.

In practice, Windows operating system provides asynchronous transmission I/O mechanisms such as asynchronous selection (WSAAsyncSelect), event selection (WSAEventSelect), overlapped I/O and completion port (CompletI/On Port). Therefore, the present application may also use other mechanisms selected from the above asynchronous mechanism.

The present application preferably uses I/O completion port mechanism. "Completion Port" mechanism is the most complicated I/O mechanism to date. However, if one application program needs to simultaneously manage many sockets, an optimal system performance may be achieved by using this mechanism.

Regarding Overlapped I/O, the release of Winsock2 enables Socket I/O to have a uniform port with file I/O. Socket I/O may be performed by Win32 file operating function ReadFile and WriteFile. As such, the Overlapped I/O mechanism and Completion Port mechanism for ordinary file I/O may also apply to Socket I/O. The mechanism is advantage in achieving a better system performance, but with a complicated implementation procedure.

Regarding asynchronous selection, this mechanism is an asynchronous I/O mechanism provided by Winsock. By using this mechanism, an application program may receive a Windows message-based network event notification over one socket. Specifically, after a socket is duly built, WSAAsyncSelect is invoked.

Regarding event selection, this mechanism is an asynchronous I/O mechanism provided by Winsock. It is similar to asynchronous selection mechanism, allows the application program receives an event-based network event notification over one or more sockets.

Besides, in the present application, the sending of the first domain name query request to the first domain name server may further comprise:

Step P111: synchronously sending the domain name query request to the first domain name server.

Step 120: obtaining an identification IP address returned by the first domain name server, wherein the identification IP address is used to identify whether an target IP address corresponding to the domain name in the webpage request belongs to a predetermined IP address library or not.

In the present application, after the client sends the first domain name query request to the first domain name server, a processing procedure of the first domain name server comprises:

Step A1: receiving the first domain name query request sent by the client;

According to the above depictions, when the first domain name server receives the first domain name query request, a target IP address corresponding to the domain name in the client's HTTP request may be obtained according to the DNS query mechanism.

The first domain name server first obtains the first domain name query request send by the client.

Step A2: constructing a second domain name query request according to the first domain name query request, and sending it to a second domain name server.

In the present application, the first domain name server generally does not have a function of querying for the target IP address corresponding to the domain name, and the request needs to be forwarded to the second domain name server having an actual query function to query for the target IP address corresponding to the domain name. The IP address corresponding to the domain name is queried according to a corresponding routing path.

Preferably, the step of constructing the second domain name query request according to the first domain name query request and sending it to the second domain name server comprises:

Step A21: resolving the first domain name query request to obtain the domain name of the webpage request.

After the first domain name server receives the first domain name query request, the domain name of the webpage request of the client is resolved from the first domain name query request according to a resolution protocol.

Step A22: constructing the second domain name query request based on the domain name by means of a domain name query protocol.

Step A23: sending the second domain name query request to the second domain name server.

In the present application, the preset first domain name server itself is generally not responsible for querying for and resolving the target IP address corresponding to the domain name, but constructs the second domain name query request according to the domain name and sends it to the second domain name server, and an response including the IP address corresponding to the domain name is obtained from the second domain name server. The second domain name server generally is a domain name server really having a DNS query function, where the first domain name server lies or which is designated. The second domain name server may obtain the IP corresponding to the domain name according to the aforesaid DNS query mechanism, and then generate a response and return it to the first domain name server.

Certainly, the second domain name server may also be set as a domain name server having the DNS query function.

Step A3: after obtaining the response from the second domain name server, resolving the target IP address corresponding to the response, wherein the target IP address is corresponding to the domain name of the webpage request.

After obtaining the IP corresponding to the domain name, the second domain name server generates and returns a response including the IP address, and then the first domain name server resolves the response to obtain the IP address corresponding to the domain name.

Step A4: judging according to the predetermined IP address library whether the IP address is in the predetermined IP address library, and generating the identification IP address according to the judgment result, wherein the identification IP address is used to identify whether the target IP address corresponding to the domain name in the webpage request belongs to the predetermined IP address library or not.

Preferably, the generating of the identification IP address according to the judgment result comprises:

Step A31: performing matching calculation between the target IP address and the predetermined IP address library;

Step A32: if the IP address is in the predetermined IP address library, returning to the client an identification IP address indicating that the target IP address belongs to the predetermined IP address library;

Step A33: if the IP address is not in the predetermined IP address library, returning to the client an identification IP address indicating that the target IP address does not belong to the predetermined IP address library.

After the first domain name server of the present application obtains the IP address corresponding to the domain name in the client's HTTP request, it performs judgment according to the predetermined IP address library, and then generates the identification IP address based on the judgment result and returns it to the client.

Based on the IP address, a Chinese IP address range library is looked up, whether the IP address is in the predetermined IP address library is judged, and then in view of the judgment result, different identification IP addresses are employed to identify the IP address in order to indicate that whether the IP address is in the predetermined IP address library. Generally, based on the DNS resolution protocol, only a response constructed in a form of IP address can be resolved, so the target IP address corresponding to the domain name is identified in the form of the identification IP address. For example, if the target IP address corresponding to the domain name is a domestic IP, 0.0.0.0 is taken as the identification IP address to indicate that the target IP address corresponding to the domain name is a domestic IP.

Certainly, the present application may identify whether the IP address of the domain name is in the Chinese IP address range in other manners. The present application does not limit this.

Furthermore, when the IP address library is the Chinese IP address range, the target IP address is returned to the client as the identification IP address if the target IP address is not in the Chinese IP address range.

Furthermore, the generating of the identification IP address according to the judgment result comprises:

Step A3: if the target IP address belongs to the Chinese IP address range, returning to the client an identification IP address representing that the IP address is in the Chinese IP address range.

For example, when the first domain name server judges that the target IP address corresponding to the domain name is in the Chinese IP address range, a response including IP address 0.0.0.0 is returned to the client. It is feasible to return to the client a response including the identification IP address in other prescribed forms.

Sep A4: if the target IP address does not belong to the Chinese IP address range, returning the IP address to the client as the identification IP address.

Alternatively, if the target IP address does not belong to the predetermined IP address library, a response including the target IP address corresponding to the domain name is directly returned to the client.

Step 130: according to the identification IP address, judging to replace the target IP address corresponding to the domain name in the webpage request with an IP address of a proxy server; and according to the IP address corresponding to the proxy server, sending the webpage access request to the proxy server.

After the client receives the response including the identification IP address returned by the first domain name server, it resolves the identification IP address from the response, and judges whether it belongs to the predetermined IP address library according to the form of the identification IP address.

In the present application, if the client's IP address belongs to the predetermined IP address library, when the target IP address corresponding to the domain name in the client's webpage request belongs to the predetermined IP address library, the target IP address corresponding to the domain name in the client's webpage request is retained; when the target IP address corresponding to the domain name in the client's webpage request does not belong to the predetermined IP address library, the target IP address corresponding to the domain name in the client's webpage request is replaced with the IP address of the proxy server. As such, the access may be performed via proxy when the client accesses a website outside the predetermined IP address library.

When the predetermined IP address library belongs to the Chinese IP address range, the judging according to the identification IP address comprises:

Step S131: replacing the target IP address corresponding to the domain name in the webpage request with the IP address of the proxy server if the identification IP address indicates that the target IP address does not belong to the Chinese IP address range;

Step S131: retaining the target IP address corresponding to the domain name in the webpage request if the identification IP address indicates that the target IP address belongs to the Chinese IP address range.

Generally, the judgment is made based on the form of the identification IP address defined by the client and the first domain name server. For example, in the previous example, the identification IP address in the response is resolved as 0.0.0.0, then the client may judge that the target IP address corresponding to the domain is in the Chinese IP address range; and if the identification IP address is not 0.0.0.0, the client may judge that the target IP address corresponding to the domain name is an address outside the Chinese IP address range, wherein the address range where the client lies is in the Chinese IP address range.

When the target IP address corresponding to the domain name is judged as an address outside the Chinese IP address range, the target IP address in the webpage request is replaced with the IP address of the proxy server, i.e., the webpage request, which originally accesses the target IP address corresponding to the domain name in the webpage request, accesses the IP address of the proxy server now.

Besides, when the target IP address corresponding to the domain name is judged in the Chinese IP address range, the above replacement is not made, and the webpage request performs access according to the target IP address of the page request. That is, the webpage request directly accesses the target IP address corresponding to the domain name in the webpage request.

Preferably, the target IP address of the webpage request is replaced with the IP address of the proxy server by means of the domain name query function.

Step 140: according to the IP address corresponding to the proxy server, sending the webpage access request corresponding to the overseas IP address to the proxy server.

After the above replacement is conducted, the client's webpage request to access an IP address outside the predetermined IP address library may be forwarded to the proxy server for accessing.

Besides, preferably, the sending of the webpage access request corresponding to the overseas IP address to the proxy server according to the IP address corresponding to the proxy server comprises:

Step C1: adding a validation protocol to the client's webpage request;

Step C2: validating whether the client has right to access the proxy server according to the validation protocol when the proxy server receives the webpage request.

In other words, in the present application, when the client sends the webpage request to the proxy server, the validation protocol is added to the request according to an agreement with the proxy server, thereby ensuring security of content of the webpage request.

Referring to FIG. 2, illustrated is a flow chart of a method for accessing a website according to an embodiment of the present invention, which comprises:

Step 210: receiving a first domain name query request sent by the client;

Step 220: constructing a second domain name query request according to the first domain name query request, and sending it to a second domain name server;

Step 230: after obtaining a response from the second domain name server, resolving the target IP address corresponding to the response, wherein the target IP address is corresponding to a domain name of the webpage request;

Step 240: judging according to the predetermined IP address library whether the IP address is in the predetermined IP address library, and generating the identification IP address according to the judgment result, wherein the identification IP address is used to identify whether the target IP address corresponding to the domain name in the webpage request belongs to the predetermined IP address library or not.

Step 250: returning the identification IP address to the client.

Preferably, the step of constructing the second domain name query request according to the first domain name query request and sending it to a second domain name server comprises:

Step L1: resolving the first domain query request to obtain the domain name of the webpage request;

Step L2: constructing the second domain name query request based on the domain name according to a domain name query protocol;

Step L3: sending the second domain name query request to the second domain name server.

Preferably, the generating of the identification IP address according to the judgment result comprises:

Step M1: performing matching calculation between the target IP address and the predetermined IP address library;

Step M2: if the IP address is in the predetermined IP address library, returning to the client an identification IP address indicating that the target IP address belongs to the predetermined IP address library;

Step M3: if the IP address is not in the predetermined IP address library, returning to the client an identification IP address indicating that the target IP address does not belong to the predetermined IP address library.

Furthermore, preferably, when the IP address library is the Chinese IP address range, the target IP address is returned to the client as the identification IP address if it is not in the Chinese IP address range. The method corresponds to the above-mentioned method, and has already been described in detail in the previous steps and will not be repeated here.

Figure 3:
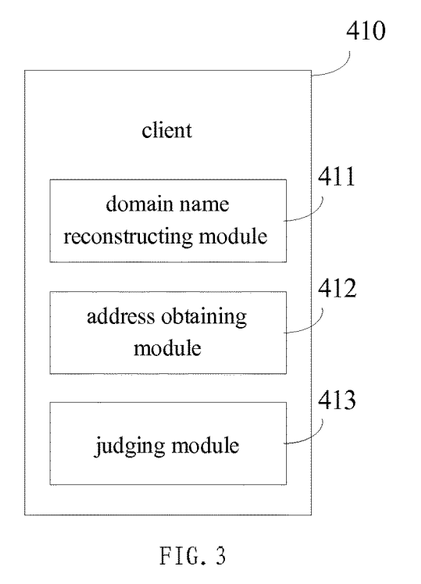
FIG. 3 illustrates a structural schematic view of a device for accessing a website according to an embodiment of the present invention.

Referring to FIG. 3, illustrated is a structural schematic view of a device for accessing a website according to the present invention, which comprises a client 410.

The client 410 comprises:

a domain name reconstructing module 411 configured to construct a first domain name query request according to a domain name in a webpage request of the client, and send the first domain name query request to a first domain name server;

an address obtaining module 412 configured to obtain an identification IP address returned by the first domain name server, wherein the identification IP address is used to identify whether an target IP address corresponding to the domain name in the webpage request belongs to a predetermined IP address library or not;

a judging module 413 configured to, according to the identification IP address, judge to replace the target IP address corresponding to the domain name in the webpage request with an IP address of a proxy server, and according to the IP address corresponding to the proxy server, send the webpage access request to the proxy server.

Preferably, the domain name reconstructing module comprises:

a hooking submodule configured to hook a domain name query function in an operating system by a hook function;

a request construction submodule configured to construct the first domain name query request for the domain name in the client's webpage request by means of the domain query function;

a request sending submodule configured to send the first domain name query request to the first domain name server.

Preferably, the sending of the first domain name query request to the first domain name server comprises:

sending the domain name query request to the first domain name server by means of an asynchronous I/O mechanism.

Preferably, the asynchronous I/O mechanism comprises an I/O completion port mechanism.

Preferably, the predetermined IP address library is a Chinese IP address range.

Preferably, the judging module comprises:

a first judging submodule configured to replace the target IP address corresponding to the domain name in the webpage request with the IP address of the proxy server if the identification IP address indicates that the target IP address does not belong to the Chinese IP address range;

a second judging submodule configured to retain the target IP address corresponding to the domain name in the webpage request if the identification IP address indicates that the target IP address belongs to the Chinese IP address range.

Preferably, upon sending the webpage access request to the proxy server according to the IP address corresponding to the proxy server, the device comprises:

a security setting module configured to add a validation protocol to the client's webpage request, thereby validating whether the client has right to access the proxy server according to the validation protocol when the proxy server receives the webpage request.

Preferably, the judging to replace the target IP address corresponding to the domain name in the webpage request with the IP address of the proxy server according to the identification IP address comprises:

replacing the target IP address corresponding to the domain name in the webpage request with the IP address of the proxy server by means of the domain name query function.

Preferably, the proxy server is in Education Network.

Figure 4:
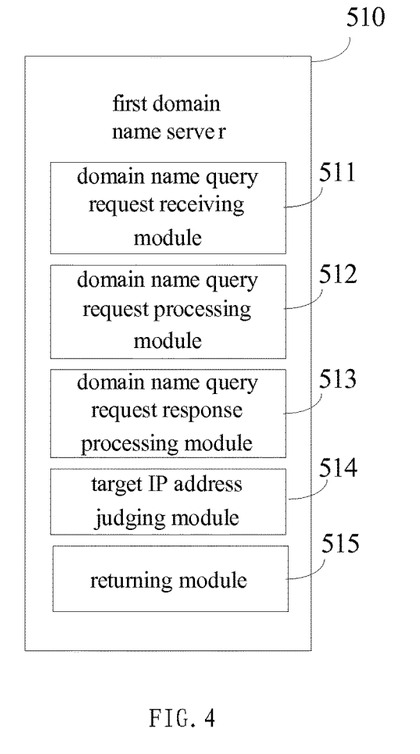
FIG. 4 illustrates a structural schematic view of a device for accessing a website corresponding to FIG. 3 according to an embodiment of the present invention.

Referring to FIG. 4, illustrated is a structural schematic view of a device for accessing a website according to the present invention, which comprises a first domain name server 510.

The first domain name server 510 comprises:

a domain name query request receiving module 511 configured to receive a first domain name query request sent by the client;

a domain name query request processing module 512 configured to construct a second domain name query request according to the first domain name query request, and send it to a second domain name server;

a domain name query request response processing module 513 configured to, after obtaining a response from the second domain name server, resolve the target IP address corresponding to the response, wherein the target IP address is corresponding to a domain name of the webpage request;

a target IP address judging module 514 configured to judge according to a predetermined IP address library whether the target IP address is in the predetermined IP address library, and generate an identification IP address according to the judgment result, wherein the identification IP address is used to identify whether the target IP address corresponding to the domain name in the webpage request belongs to the predetermined IP address library or not.

a returning module 515 configured to return the identification IP address to the client.

Preferably, the domain name query request processing module comprises:

a resolving submodule configured to resolve the first domain query request to obtain the domain name of the webpage request;

a constructing submodule configured to construct the second domain name query request based on the domain name according to a domain name query protocol;

a sending submodule configured to send the second domain name query request to the second domain name server.

Preferably, the domain name query request response processing module comprises:

a matching calculation module configured to perform matching calculation between the target IP address and the predetermined IP address library;

a first identification IP address retuning module configured to, if the IP address is in the predetermined IP address library, return to the client an identification IP address indicating that the target IP address belongs to the predetermined IP address library;

a second identification IP address retuning module configured to, if the IP address is not in the predetermined IP address library, return to the client an identification IP address indicating that the target IP address does not belong to the predetermined IP address library.

Preferably, when the IP address library is the Chinese IP address range, the second identification IP address retuning module is used to return the target IP address to the client as the identification IP address if it is not in the Chinese IP address range.

Figure 5:
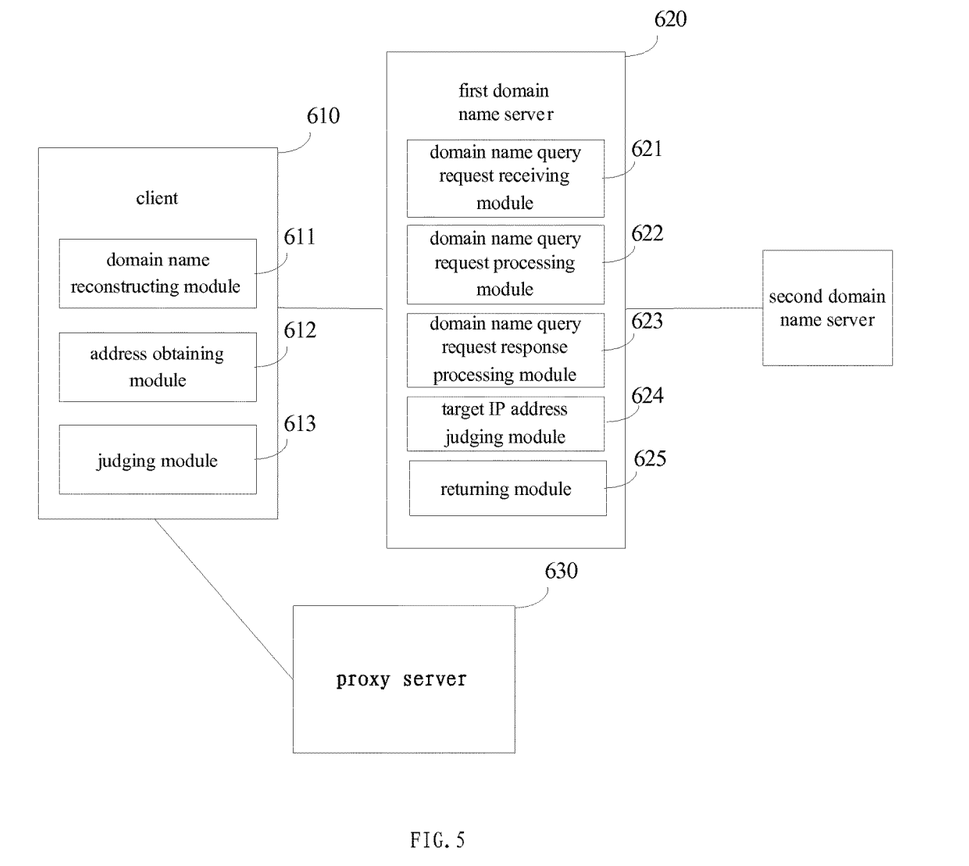
FIG. 5 illustrates a structural schematic view of a system for accessing a website according to an embodiment of the present invention.

Referring to FIG. 5, illustrated is a structural schematic view of a system for accessing a website according to the present invention, which comprises a client 610, a first domain name server 620, and a proxy server 630.

The client 610 comprises:

a domain name reconstructing module 611 configured to construct a first domain name query request according to a domain name in a webpage request of the client, and send the first domain name query request to a first domain name server;

an address obtaining module 612 configured to obtain an identification IP address returned by the first domain name server, wherein the identification IP address is used to identify whether an target IP address corresponding to the domain name in the webpage request belongs to a predetermined IP address library or not;

a judging module 613 configured to, according to the identification IP address, judge to replace the target IP address corresponding to the domain name in the webpage request with an IP address of a proxy server 630, and according to the IP address corresponding to the proxy server 630, send the webpage access request to the proxy server 630;

The first domain name server 620 comprises:

a domain name query request receiving module 621 configured to receive a first domain name query request sent by the client;

a domain name query request processing module 622 configured to construct a second domain name query request according to the first domain name query request, and send it to a second domain name server;

a domain name query request response processing module 623 configured to, after obtaining a response from the second domain name server, resolve the target IP address corresponding to the response, wherein the target IP address is corresponding to a domain name of the webpage request;

a target IP address judging module 624 configured to judge according to a predetermined IP address library whether the target IP address is in the predetermined IP address library, and generate an identification IP address according to the judgment result, wherein the identification IP address is used to identify whether the target IP address corresponding to the domain name in the webpage request belongs to the predetermined IP address library or not.

a returning module 625 configured to return the identification IP address to the client.

The embodiment of the system is substantially similar to the previous method embodiment, so it is describer briefly and reference may be made to the corresponding depictions in the above method embodiment.

Embodiments of the present description all are described in a progressive manner, cross-reference may be made to identical or similar portions of the embodiments, and each embodiment focuses on differences from other embodiments.

Embodiments regarding parts in the present invention may be implemented in hardware, or implemented by software modules running on one or more processors, or implemented in their combinations. Those skilled in the art should understand that a microprocessor or digital signal processor (DSP) may be used in practice to implement some or all functions of some or all parts of the device for accessing a website according to embodiments of the present invention. The present invention may also be implemented as an apparatus or device program (e.g., computer program and computer program product) for executing part or all methods described here. Such programs for implementing the present invention may be stored in a computer-readable medium, or may be in a form of having one or more signals. Such signals can be obtained by downloading from the Internet, or provided on a carrier signal or provided in any other forms.

Figure 6:
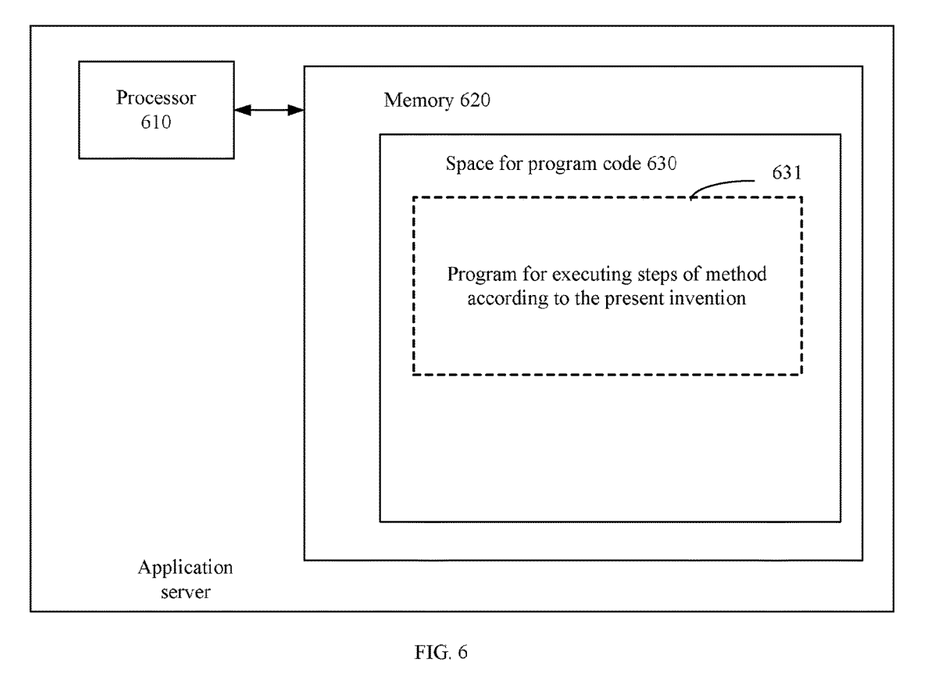
FIG. 6 illustrates a block diagram of a server for executing the method according to the present invention.
Figure 7:
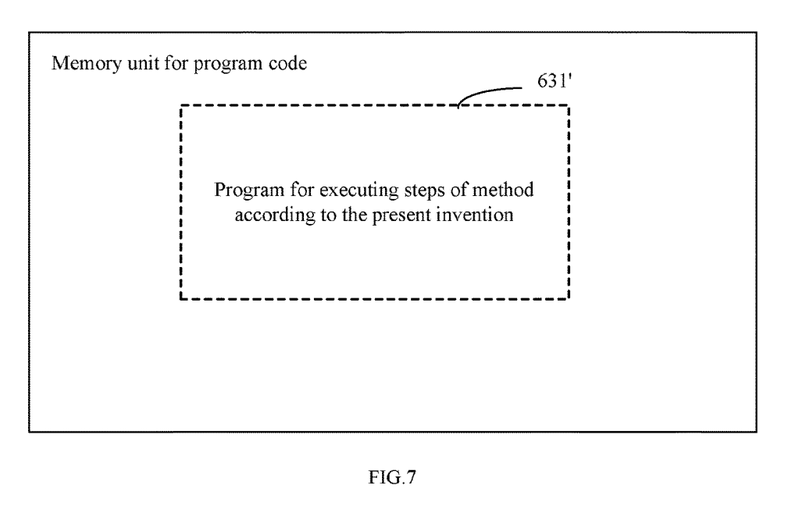
FIG. 7 illustrates a memory unit for maintaining or carrying a program code for implementing the method according to the present invention.

For example, FIG. 6 illustrates a server, such as an application server, which can implement the method for accessing a website according to the present invention. The server conventionally comprises a processor 610 and a computer program product or computer-readable medium in the form of a memory 620. The memory 620 may be an electronic memory such as flash memory, EEPROM (Electrically Erasable Programmable Read—Only Memory), EPROM, hard disk, ROM or the-like. The memory 620 has a storage space 630 for a program code 631 for executing any step of the above method. For example, the storage space 630 for the program code may comprise program codes 631 respectively for implementing steps of the above method. These program codes may be read from one or more computer program products or written into one or more computer program products. These computer program products comprise program code carriers such as hard disk, compact disk (CD), memory card or floppy disk. Such computer program products are usually portable or fixed memory units as shown in FIG. 7. The memory unit may have a storage segment, a storage space or the like arranged in a similar way to the memory 620 in the server of FIG. 6. The program code may for example be compressed in a suitable form. Usually, the memory unit includes a computer-readable code 631', namely, a code readable by a processor for example similar to the processor 610. When these codes are run by the server, the server is caused to execute steps of the method described above.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

The description provided here describes a lot of specific details. However, it is appreciated that embodiments of the present invention may be implemented in the absence of these specific details. In some embodiments, in order to understand the present description without confusions, methods, structures and technologies well known in the art are not specified in detail.

It should be noted that the above embodiments are intended to illustrate but not to limit the present invention, and those skilled in the art may design alternative embodiments without departing from the scope of the appended claims. In claims, any reference signs placed in parentheses should not be construed as limiting the claims. The word "comprising" does not exclude the presence of elements or steps not listed in a claim. The word "a" or "an" preceding an element does not exclude the presence of a plurality of such elements. The present invention may be implemented by virtue of hardware including several different elements and by virtue of a properly-programmed computer. In claims enumerating several units of a device, several of these units can be embodied by one and the same item of hardware. The usage of the words first, second and third, et cetera, does not indicate any ordering. These words are to be interpreted as names.

In addition, it should be noted that the language used in the specification has been principally selected for readability and instructional purposes, and may not have been selected to delineate or circumscribe the inventive subject matter. Therefore, those having ordinary skill in the art appreciate that many modifications and variations without departing from the scope and spirit of the appended claims are obvious. The disclosure of the present invention is intended to be illustrative, but not limiting, of the scope of the invention, which is set forth in the claims.

What is claimed is:

1. A method for accessing a website, comprising:
constructing a first domain name query request according to a domain name in a webpage request of a client, and sending the first domain name query request to a first domain name server;
hooking a domain name query function in an operating system by a hook function;
constructing the first domain name query request for the domain name in the webpage request of the client using the domain query function;
sending the first domain name query request to the first domain name server;
obtaining an identification internet protocol (IP) address returned by the first domain name server, wherein the identification IP address is used to identify whether a target IP address corresponding to the domain name in the webpage request belongs to a predetermined IP address library or not;
when the identification IP address identifies that the target IP address corresponding to the domain name in the webpage request belongs to the predetermined IP address library, determining to retain the target IP address corresponding to the domain name in the webpage request, and the webpage request is sent to directly access the target IP address corresponding to the domain name in the webpage request;
when the identification IP address identifies that the target IP address corresponding to the domain name in the webpage request does not belong to the predetermined IP address library, according to the identification IP address, determining to replace the target IP address corresponding to the domain name in the webpage request with an IP address of a proxy server; and
according to the IP address corresponding to the proxy server, sending the webpage request to the proxy server.

2. The method according to claim 1, wherein the sending of the first domain name query request to the first domain name server comprises:
sending the domain name query request to the first domain name server using an asynchronous I/O mechanism.

3. The method according to claim 2, wherein the asynchronous I/O mechanism comprises an I/O completion port mechanism.

4. The method according to claim 1, wherein the sending of the webpage request to the proxy server according to the IP address corresponding to the proxy server comprises:
adding a validation protocol to the webpage request of the client; and
validating whether the client has a right to access the proxy server according to the validation protocol when the proxy server receives the webpage request.

5. The method according to claim 1, wherein the determining to replace the target IP address corresponding to the domain name in the webpage request with the IP address of the proxy server according to the identification IP address comprises:
replacing the target IP address corresponding to the domain name in the webpage request with the IP address of the proxy server using the domain name query function.

6. A method for accessing a website, comprising:
receiving a first domain name query request sent by a client;
constructing a second domain name query request according to the first domain name query request, and sending the second domain name query request to a second domain name server;
resolving the first domain query request to obtain the domain name of the webpage request;
constructing the second domain name query request based on the domain name according to a domain name query protocol;
sending the second domain name query request to the second domain name server;
after obtaining a response from the second domain name server, resolving a target internet protocol (IP) address corresponding to the response, wherein the target IP address corresponds to a domain name of a webpage request;
determining according to a predetermined IP address library whether the target IP address is in the predetermined IP address library, and generating an identification IP address, wherein the identification IP address is used to identify whether the target IP address corresponding to the domain name in the webpage request belongs to the predetermined IP address library or not;
returning the identification IP address to the client;
when the identification IP address identifies that the target IP address corresponding to the domain name in the webpage request belongs to the predetermined IP address library, determining to retain the target IP address corresponding to the domain name in the webpage request, and the webpage request is sent to directly access the target IP address corresponding to the domain name in the webpage request; and
when the identification IP address identifies that the target IP address corresponding to the domain name in the webpage request does not belong to the predetermined IP address library, the target IP address corresponding to the domain name in the webpage request is determined to be replaced with an IP address of a proxy server.

7. The method according to claim 6, wherein the generating of the identification IP address comprises:
performing matching calculation between the target IP address and the predetermined IP address library;
if the IP address is in the predetermined IP address library, returning to the client an identification IP address indicating that the target IP address belongs to the predetermined IP address library; and
if the IP address is not in the predetermined IP address library, returning to the client an identification IP address indicating that the target IP address does not belong to the predetermined IP address library.

8. A device for accessing a website, comprising:
a memory having instructions stored thereon; and
at least one processor to execute the instructions to perform operations comprising:
constructing a first domain name query request according to a domain name in a webpage request of a client, and sending the first domain name query request to a first domain name server;
hooking a domain name query function in an operating system by a hook function;
constructing the first domain name query request for the domain name in the webpage request of the client using the domain query function;

sending the first domain name query request to the first domain name server;

obtaining an identification internet protocol (IP) address returned by the first domain name server, wherein the identification IP address is used to identify whether a target IP address corresponding to the domain name in the webpage request belongs to a predetermined IP address library or not;

when the identification IP address identifies that the target IP address corresponding to the domain name in the webpage request belongs to the predetermined IP address library, determining to retain the target IP address corresponding to the domain name in the webpage request, and the webpage request is sent to directly access the target IP address corresponding to the domain name in the webpage request;

when the identification IP address identifies that the target IP address corresponding to the domain name in the webpage request does not belong to the predetermined IP address library, determining, to replace the target IP address corresponding to the domain name in the webpage request with an IP address of a proxy server; and according to the IP address corresponding to the proxy server, sending the webpage request to the proxy server.

9. The device according to claim 8, wherein the sending of the first domain name query request to the first domain name server comprises:

sending the domain name query request to the first domain name server using an asynchronous I/O mechanism.

10. The device according to claim 9, wherein the asynchronous I/O mechanism comprises an I/O completion port mechanism.

11. The device according to claim 8, wherein the sending the webpage request to the proxy server according to the IP address corresponding to the proxy server, comprises:

adding a validation protocol to the webpage request of the client; and validating whether the client has a right to access the proxy server according to the validation protocol when the proxy server receives the webpage request.

12. The device according to claim 8, wherein the determining to replace the target IP address corresponding to the domain name in the webpage request with the IP address of the proxy server according to the identification IP address comprises:

replacing the target IP address corresponding to the domain name in the webpage request with the IP address of the proxy server using the domain name query function.

13. A device for accessing a website, comprising:
a memory having instructions stored thereon; and
at least one processor to execute the instructions to perform operations comprising:

receiving a first domain name query request sent by a client;

constructing a second domain name query request according to the first domain name query request, and sending the second domain name query request to a second domain name server;

resolving the first domain query request to obtain the domain name of the webpage request;

constructing the second domain name query request based on the domain name according to a domain name query protocol;

sending the second domain name query request to the second domain name server;

after obtaining a response from the second domain name server, resolving a target internet protocol (IP) address corresponding to the response, wherein the target IP address is corresponding to a domain name of the webpage request;

determining according to a predetermined IP address library whether the target IP address is in the predetermined IP address library, and generating an identification IP address, wherein the identification IP address is used to identify whether the target IP address corresponding to the domain name in the webpage request belongs to the predetermined IP address library or not;

returning the identification IP address to the client;

when the identification IP address identifies that the target IP address corresponding to the domain name in the webpage request belongs to the predetermined IP address library, determining to retain the target IP address corresponding to the domain name in the webpage request, and the webpage request is sent to directly access the target IP address corresponding to the domain name in the webpage request; and when the identification IP address identifies that the target IP address corresponding to the domain name in the webpage request does not belong to the predetermined IP address library, the target IP address corresponding to the domain name in the webpage request is determined to be replaced with an IP address of a proxy server.

14. The device according to claim 13, wherein the generating of the identification IP address comprises:

performing matching calculation between the target IP address and the predetermined IP address library;

if the IP address is in the predetermined IP address library, returning to the client an identification IP address indicating that the target IP address belongs to the predetermined IP address library; and if the IP address is not in the predetermined IP address library, returning to the client an identification IP address indicating that the target IP address does not belong to the predetermined IP address library.

* * * * *